(12) United States Patent
Schindler (10) Patent No.: US 8,531,130 B2
(45) Date of Patent: Sep. 10, 2013

(54) SYSTEM, METHOD AND APPARATUS FOR BRIGHTNESS ADJUSTING OF AN ILLUMINATED LOGO

(75) Inventor: John Schindler, Ladera Ranch, CA (US)

(73) Assignee: Vizio, Inc., Irvine, CA (US)

( * ) Notice: Subject to any disclaimer, the term of this patent is extended or adjusted under 35 U.S.C. 154(b) by 718 days.

(21) Appl. No.: 12/750,726

(22) Filed: Mar. 31, 2010

(65) Prior Publication Data
US 2011/0241553 A1 Oct. 6, 2011

(51) Int. Cl.
*H05B 41/36* (2006.01)
(52) U.S. Cl.
USPC ............................ 315/307; 315/291; 315/308
(58) Field of Classification Search
USPC ............. 315/185 R, 192, 291, 294, 297, 307, 315/308
See application file for complete search history.

(56) References Cited

U.S. PATENT DOCUMENTS

| 7,907,114 B2* | 3/2011 | Kurosaki et al. ............... 345/102 |
| 2002/0047624 A1* | 4/2002 | Stam et al. ..................... 315/291 |
| 2008/0297591 A1* | 12/2008 | Aarts et al. ...................... 348/51 |

* cited by examiner

*Primary Examiner* — Douglas W Owens
*Assistant Examiner* — Jianzi Chen
(74) *Attorney, Agent, or Firm* — Law Office of Scott C. Harris, Inc.

(57) ABSTRACT

An application for a logo with an adjustable internal lighting includes an illuminated logo, a sensor and a circuit that controls the illuminated logo. The brightness and/or color of the illuminated logo are controlled by the circuit based upon ambient light and optionally, a user preference, operating mode and/or time-of-day. The sensor detects ambient light and signals the circuit to increase or decrease the brightness of the illuminated logo.

14 Claims, 6 Drawing Sheets

SYSTEM, METHOD AND APPARATUS FOR BRIGHTNESS ADJUSTING OF AN ILLUMINATED LOGO

CROSS-REFERENCE TO RELATED APPLICATION

This application is related to U.S. application titled, "SYSTEM, METHOD AND APPARATUS FOR ILLUMINATING A BEZEL," Ser. No. 12/509,897, filed on Jul. 27, 2009, and inventors Kenneth Lowe, Matthew Blake McRae and John Schindler.

FIELD OF THE INVENTION

This invention relates to the field of display devices and other audio devices and more particularly to a system for illuminating a logo of a display device.

BACKGROUND OF THE INVENTION

Many devices such as LCD or Plasma televisions, stereo systems, amplifiers, back-up hard drives, etc. have some type of identification or logo referring, usually, to the manufacturer. For example, televisions made by a company called Vizio have the logo "VIZIO" on a prominent surface such as the bezel around the display. Some such devices have a power indicator that is illuminates to show the user whether the device is on, charging, in standby, etc.

Recently, there have been several devices with the power indicator and the logo integrated into an illuminated logo. Often, the illuminated logo is either off or a first color when the device is off (or standby) and the illuminated logo is on or a second color when the device is active (on).

Since such illuminated logos are often larger than the illuminated power indicator, the logos are often very easy to see, at times too easy to see. When a room is completely dark, a brightly illuminated logo often becomes a distraction. Even when the device is off or in standby, the illuminated logos are often illuminated in a different color than when the device is on and, while visible in the daylight, the brightness often becomes a distraction at night, especially when the device is in a sleeping environment.

What is needed is an illuminated logo of which a brightness is adjusted based upon the environment and user preferences.

SUMMARY

The present invention includes an illuminated logo with internal lighting such that, the brightness and/or color of the illuminated logo are modified based upon either user preference or ambient light.

In one embodiment, an illuminated logo system is disclosed. The illuminated logo is mounted on a device such as a bezel of a television. The illuminated logo is illuminated by a controlled source of light. A sensor measures the ambient light in a vicinity of the device and a circuit within the device controls at least one brightness level of the controlled source of light dependent upon the ambient light as detected by the sensor.

In another embodiment, a method of controlling an illuminated logo is disclosed including providing an illuminated logo that has a circuit for controlling a brightness level of the illuminated logo. The method includes detecting a level of ambient light and controlling the brightness level of the illuminated logo based upon the level of ambient light.

In another embodiment, an illuminated logo system is disclosed including an illuminated logo mounted on a periphery of a device. A device senses ambient light in a vicinity of the device and another device controls an illumination brightness of the logo at a brightness proportional to the ambient light.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures. This description refers to an illuminated logo or letters or other emblem, etc. Throughout this description, the term "illuminated logo" refers to any type of illuminated logos; letters; words; charms; icons; combination of illuminated logos, letters, words, charms, icons, etc. For example, an illuminate logo includes a company name such as "VIZIO," or a company name and a logo, etc. All or any part of the illuminated logo is illuminated and it is anticipated that in some embodiments, multiple sources of illumination is used, for example, a different source of illumination corresponding to each letter of the illuminated logo. Furthermore, it is anticipated that either all sources of illumination are controlled together (same brightness) or each individual source of illumination is controlled independently (same or different brightness for each).

Figure 1:
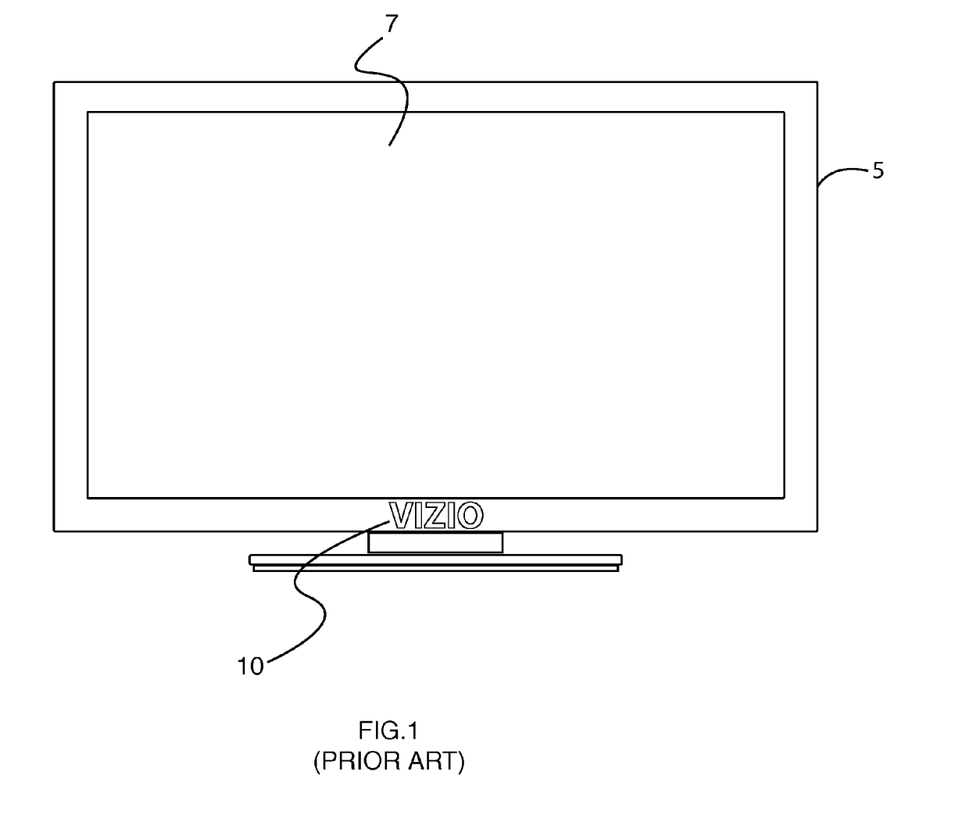
FIG. 1 illustrates a plan view of a device (e.g. television) in the off state with an illuminated logo of the prior art.
Figure 2:
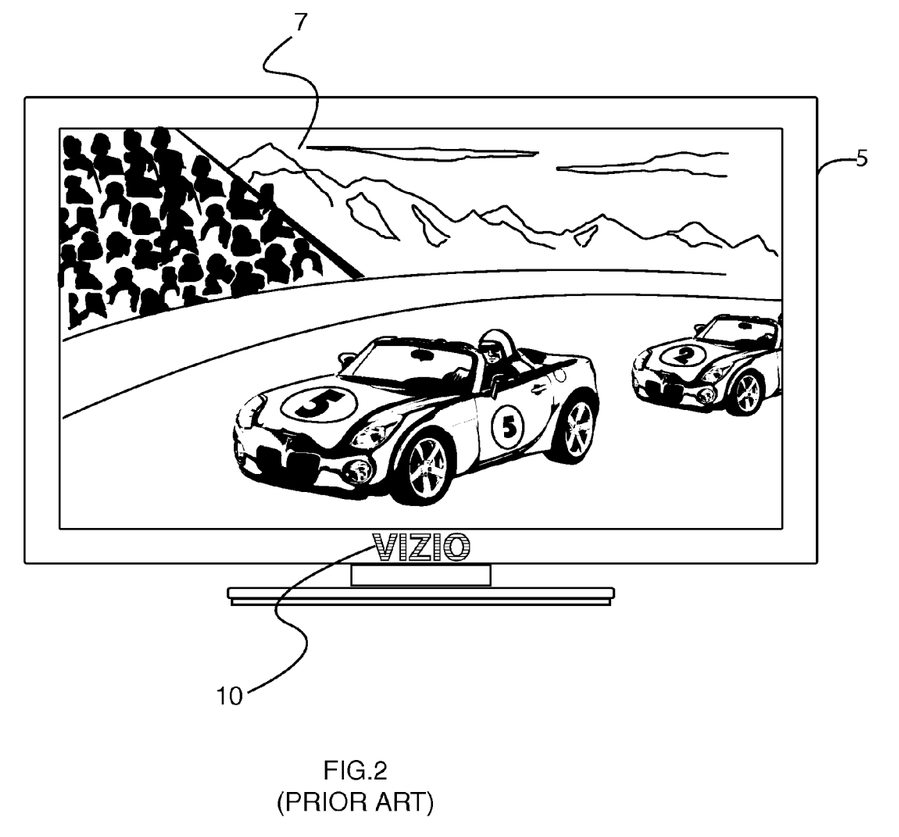
FIG. 2 illustrates a plan view of a device (e.g. television in the on-state with an illuminated logo of the prior art.

Referring to FIGS. 1 and 2, plan views of a device (e.g. television 5) in the off state (FIG. 1) and the on state (FIG. 2) with an illuminated logo of the prior art is described. In the prior art, the illuminated logo 10 generally had two states that corresponded to two states of the device 5. When the device (television) 5 is off (e.g. no content displayed on the display 7), the illuminated logo 10 is in a first state (e.g. not illuminated or illuminated with a dim orange glow) and when the device (television) 5 is on (e.g. content on the display 7), the illuminated logo 10 is in a second state (e.g. illuminated with a bright white glow). In some devices, the viewer/user was capable of manually changing the settings of illumination, but most devices, such as televisions 5, had only two color/brightness levels. Since the illuminated logo 10 is often located next to the viewing display 7, when the device (television) 5 is on and the viewer is watching the display 7, the illuminated logo 10 often distracted from the display 7, especially when the viewer lowers the ambient light, when the illuminated logo 10 becomes a major distraction to viewing. Additionally, many viewers sleep in the same room as some devices (televisions)

5 and when the devices (televisions) 5 are off, the illuminated logo 10 being in its first state (e.g. illuminated with a dim orange glow) often distracts from sleep.

Figure 3:
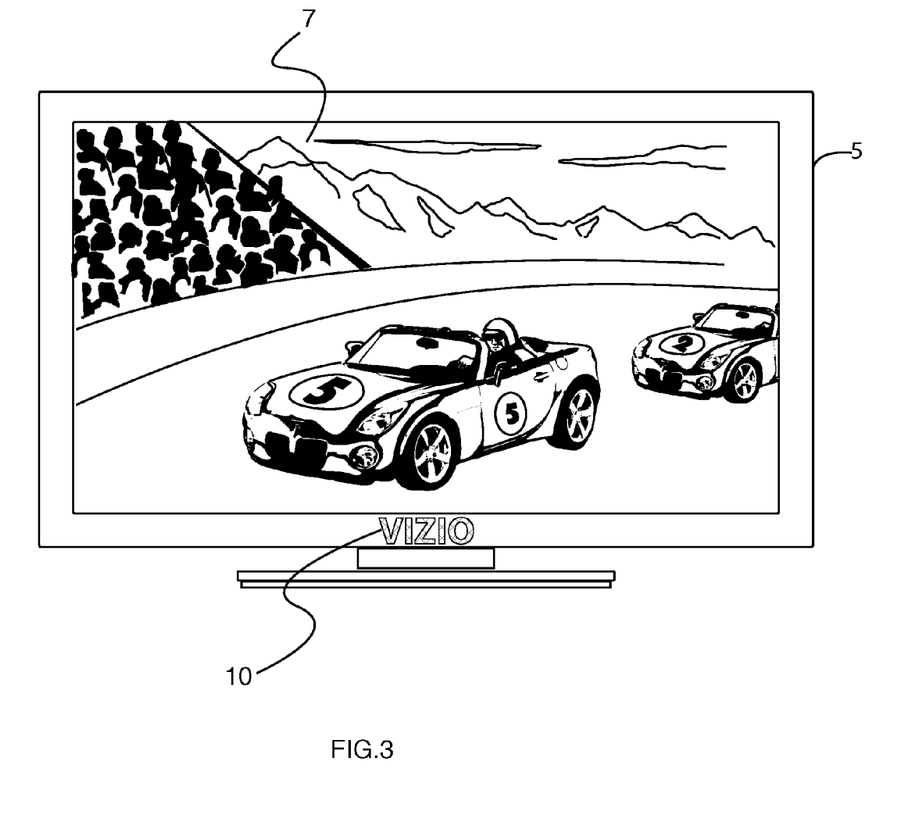
FIG. 3 illustrates a plan view of a device (e.g. television with an illuminated logo in high ambient light.
Figure 4:
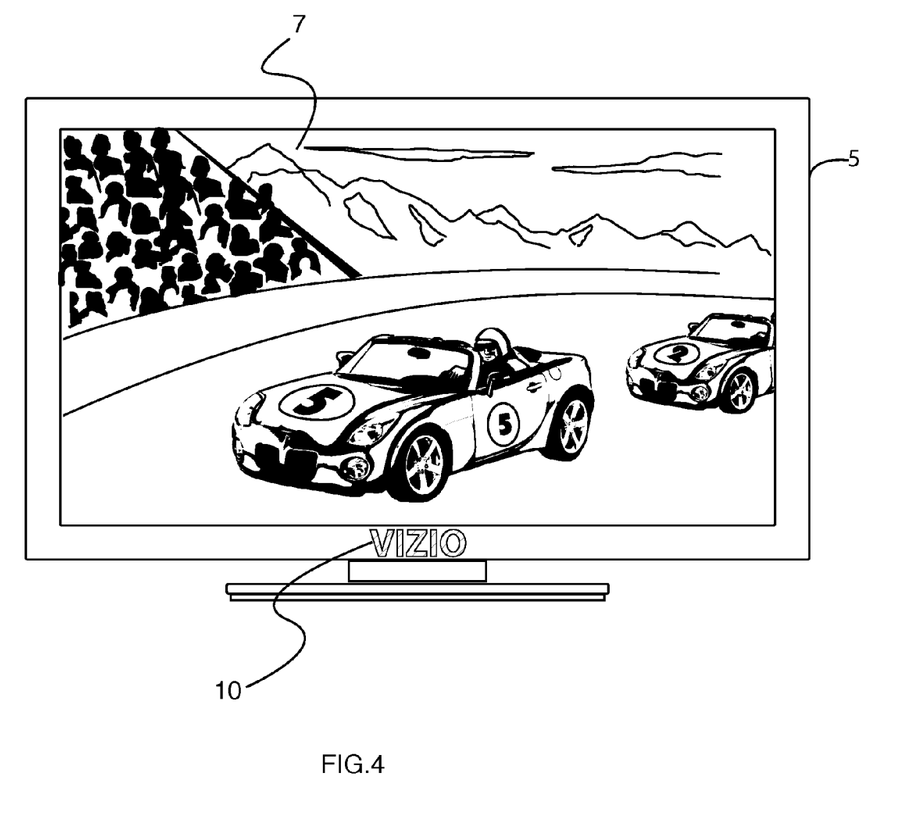
FIG. 4 illustrates a plan view of a device (e.g. television with an illuminated logo in low ambient light.

Referring to FIGS. 3 and 4, plan views of a device (e.g. television 5 with an illuminated logo in high ambient light (FIG. 3) and in low ambient light (FIG. 4) is described. The illuminated logo 10 has at least two states corresponding to at least two states of the device 5. For example, when the device (television) 5 is off, the illuminated logo 10 is in a first state (e.g. illuminated with a dim orange glow) and when the device (television) 5 is on, the illuminated logo 10 is in a second state (e.g. illuminated with a bright white glow). In some embodiments, the viewer/user is provided with setup menus for manually changing the settings. Since the illuminated logo 10 is often located next to the viewing display 7, it is important that the illuminated logo 10 of the device (television) 5 presents a minimal distraction, both when the device/television 5 is on (as in FIGS. 3 and 4) and/or off. When the ambient light surrounding the device/television 5 is low (as in FIG. 3), the brightness of the illuminated logo 10 is reduced to reduce distraction to viewing. This is important, for example, when the user sleeps or watches a program in a dark room. When the ambient light surrounding the device/television 5 is high (e.g. daylight as in FIG. 4), the brightness of the illuminated logo 10 is increased to improve visibility of the logo. This is important, for example, to provide positive feedback to a user after initially turning on power to the device/television 5, before an image is displayed on the display 7.

In some embodiments, the brightness of the illuminated logo 10 is set proportional to the ambient light. For example, in a dark room (FIG. 3), the brightness of the illuminated logo 10 is set to a minimum value; and in a brightly lit room (e.g. FIG. 4), the brightness of the illuminated logo 10 is set to a maximum value, whether the device/television 5 is on or off. For example, when the device/television 5 is off, the color of the illuminated logo 10 is a first color such as orange and the illuminated logo 10 is lit brightly in a bright ambient environment and lit dimly in a low-lit ambient environment. When the device/television 5 is one, the color of the illuminated logo 10 is a second color such as white or blue and the illuminated logo 10 is lit brightly in a bright ambient environment and lit dimly in a low-lit ambient environment. It is also anticipated that other modes are anticipated such as standby, etc, also with the illuminated logo 10 changing brightness dependent upon the ambient light.

Figure 5:
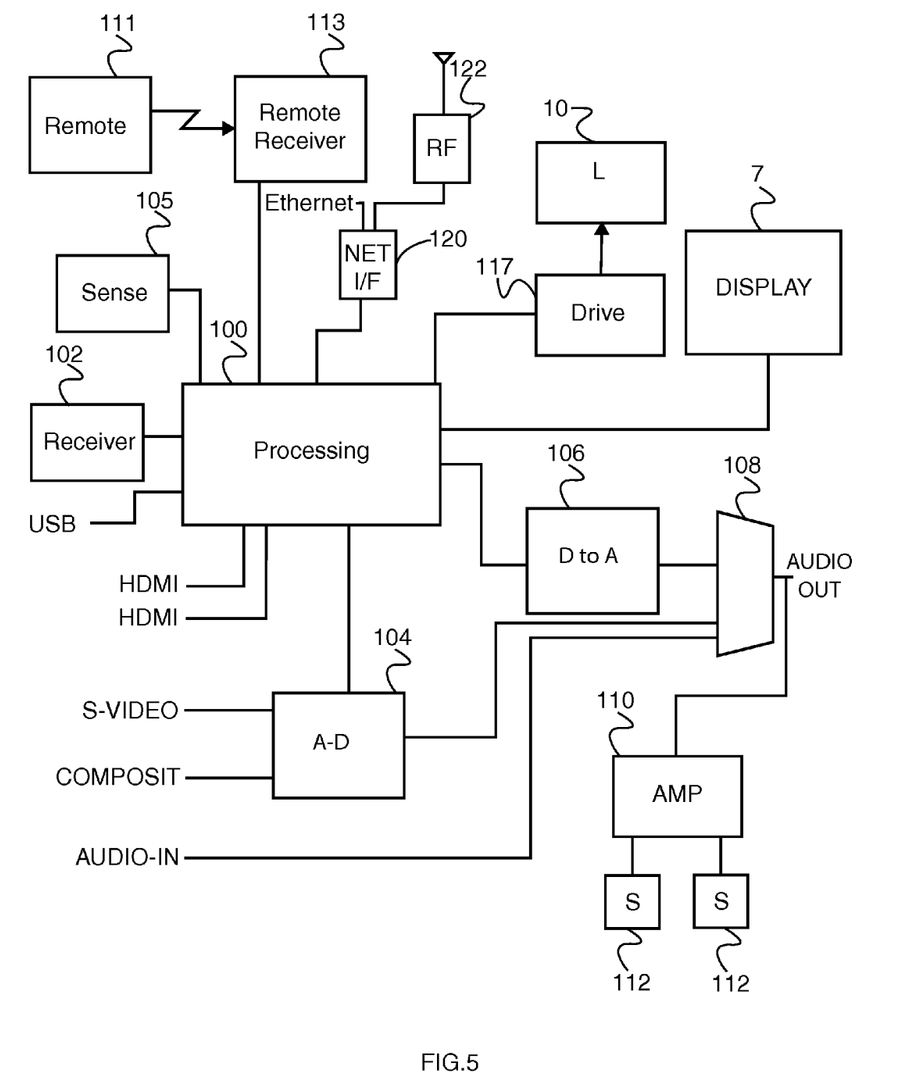
FIG. 5 illustrates a first schematic view of a typical monitor/television device.

Referring to FIG. 5, a first schematic view of a typical device (television) 5 of the present invention will be described. This figure is intended as a representative schematic of a typical device, in this example, a monitor/television 5. In practice, some elements are not present in some monitors/televisions 5 and/or additional elements are present in some monitors/televisions 5. In this example, a display panel 7 is connected to a processing element 100. The display panel 7 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Multimedia Interface (HDMI), USB ports and an analog-to-digital converter 104. The analog-to-digital converter 104 accepts analog inputs from legacy-video sources such as S-Video and Composite video and converts the analog video signal into a digital video signal before passing it to the processing element. The processing element controls the display of the video on the display panel 7.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or bi-directional.

In some embodiments, a light sensor 105 is interfaced to the processing element 100, for example, a photodiode. The light sensor 105 conveys a value representing the ambient light level in the vicinity of the front of the monitor/television 5. This value is used, for example, to vary the brightness of the illuminated logo 10 responsive to the ambient light present in front of the monitor/television 5.

In this example, the processing element 100 controls the brightness of the illuminated logo 10 through a driver 117. In this, serial or parallel outputs from the processing element 100 interface with the driver 117 which is connected to and controls the brightness and/or color of the illuminated logo 10. It is well known in the industry how to control light emission on devices such as described for the illuminated logo 10 and this is but an example of such. In some embodiments, the functionality of the logo driver 117 is integrated into the processing element 100. In some embodiments, the drivers 117 are integrated into the illuminated logo 10. Any other known configuration is anticipated and functions within the present invention. It is well known how to control the brightness of illuminated logo 10, including Liquid Crystal Displays (LCD), plasma displays, OLED displays, electronic paper, Light Emitting Diode (LED) arrays, etc. For example, the illuminated logo 10 comprises one or more LEDS 12 (see FIG. 6), the driver 117, in one embodiment, uses pulse-width modulation to control the brightness of the LEDS 12 (e.g., the wider the pulse width, the brighter the LEDS 12 will shine). Alternately, in another embodiment, the driver 117 controls the current flowing through the LEDS 12 to control the brightness. In some embodiments, the processing element 100 is involved in measuring the ambient using the sensor 105 and controlling the brightness of the logo 10 through a driver 117, with or without providing user directives (e.g. menus) for changing parameters such as logo color, range of brightness, etc. It is anticipated that in some embodiments, under control of the processing element 100, the brightness and/or color is modified based upon other parameters such as the time of day, program being viewed, etc.

In some embodiments, the television/monitor 5 is connected to a network, such as the Internet or local area network. In these embodiments, a network interface 120 attaches to the network and transfers data back and fourth between the processing element 100 and the network. In some embodiments, the network is a wired network such as an Ethernet network.

In other embodiments, the network is wireless such as WiFi/802.11 and a wireless interface 122 is provided.

Figure 6:
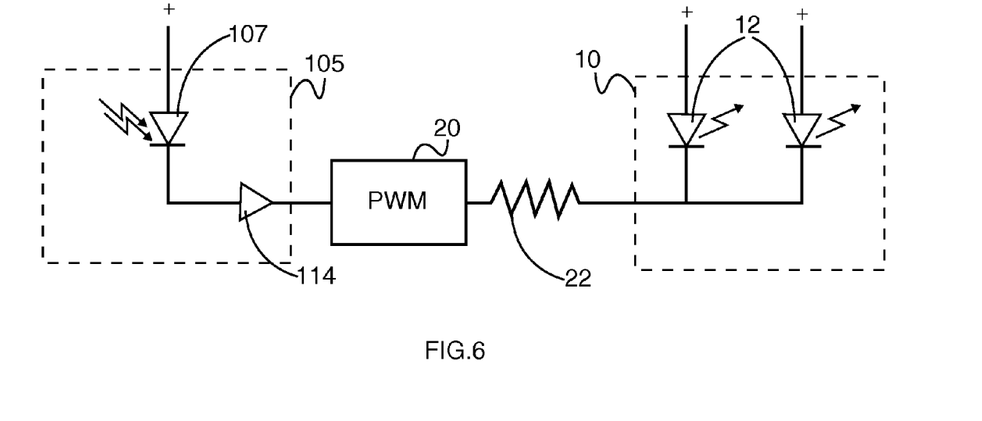
FIG. 6 illustrates a second schematic view of a typical logo illumination control.

Referring to FIG. 6, a schematic view of a typical driver is described. Although shown as a stand-alone control (e.g., no external adjustments and no processor involvement), in some embodiments, the same or similar sensors 105 and pulse-width modulators 20/22 function with the processing element 100 to control the brightness of the logo 10.

This is a representative schematic of a typical illuminated logo 10 and pulse-width modulator 20. Any known ambient light detector 105 and driver 117 combinations are anticipated. In some embodiments, the light detector 105 and driver 117 interface to the processing element 100 (as in FIG. 5) providing additional user control. For example, through setup menus, the user changes the minimum and maximum brightness of the illuminated logo 10.

In some embodiments, a light sensor 105 is interfaced to the processing element 100 (as in FIG. 5). The light sensor 105 conveys a value representing the ambient light level in the vicinity of the front of the monitor/television 5.

In the example of FIG. 6, the ambient light sensor 105 consists of a photodiode 112. The current through the photodiode 107 is proportional to the light received by the photodiode 107. It is preferred, though not required, that the photodiode 107 receive light from a front surface of the device/television 5 to accurately detect ambient light in front of the device/television 5. In this simplified circuit, the signal from the photodiode 107 is amplified by an amplifier 114 and connected to a pulse width modulator 20. The pulse width modulator 20 translates the current from the photodiode 107 into an appropriate pulse width of an output that connects to one or more light sources (e.g. LEDS 12) through a current limiting resistor 22. For example, a pulse width of 100% drives the light output devices (LEDS 12) at full power and a pulse width of 0% provides no power to the light output devices (LEDS 12). Therefore, when a maximum amount of ambient light is detected from the photodiode 107, the maximum pulse width (e.g. 100%) is produced by the pulse width modulator 20, thereby providing maximum brightness to the logo 10 from the light output devices (e.g. LEDS 12). Likewise, when a minimum amount of ambient light is detected from the photodiode 107 (e.g. the room is dark), a minimum pulse width (e.g. 30%) is produced by the pulse width modulator 20, thereby providing a low brightness from the light output devices to the logo 10 (e.g. LEDS 12). The light output devices (e.g. LEDS 12) are, for example, integrated within or optically coupled (e.g. light pipes) to the illuminated logo 10.

Many other light detectors, sensors light output device drivers and light output devices are anticipated including, but not limited to, photocells, incandescent lamps, luminescent panels, Organic LEDS (OLED), variable current drivers, variable voltage drivers, etc.

Figure 7:
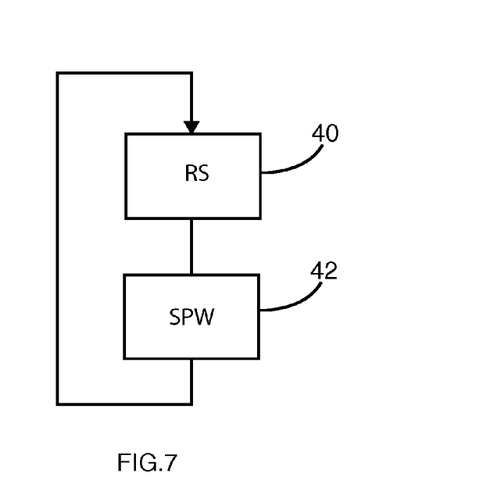
FIG. 7 illustrates a first flow chart of the present invention.

Referring to FIG. 7, a first flow chart of the present invention is described. This is an exemplary program flow executed within the processing element 100. Periodically, a signal is received 40 in the processing element 100 from the sensor 105. The processing element 100 then sets 42, for example, the pulse width output of the driver 117 to an appropriate pulse width dependent upon the ambient light. In other embodiments, the current and/or voltage are adjusted based upon the ambient light from the sensor 105.

This is but one example of a program running in the processing element 100 that controls the color and or brightness of the illuminated logo 10. Other methods, either more or less complicated are anticipated for monitoring various internal and external parameters and settings. For example, some embodiments accept user inputs to control the operation such as maximum and minimum brightness, etc. In some embodiments, the brightness and/or color are set dependent of ambient light for one mode of operation and the brightness and/or color are set independent of ambient light in another mode. As an example, user inputs and/or device 5 operational modes affect the brightness and/or color of the illuminated logo 10. For example, a user input provides for setting the off-mode color to dim yellow and the setting for on-mode color to white, and the brightness of the white is proportional to the ambient light.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An illuminated logo system, comprising:
  a logo on a periphery of a television that has a bezel surrounding a screen, the logo illuminated by a controlled source of light,
  a sensor, the sensor measuring an ambient light in a vicinity of the device, wherein the sensor and the logo are on a bezel of the television; and
  a circuit, the circuit controls a brightness of the controlled source of light dependent upon the ambient light as detected by the sensor, wherein the circuit includes a processing element, the processing element receives an indication of the ambient light from the sensor and the processing element controls the brightness of the controlled source of light dependent upon the ambient light as detected by the sensor and also based on an operating condition of the television, where the logo is controlled to be a first color when the television is off, and controlled to be a second color when the television is on, and wherein the logo is controlled to turn to the second color when the television is turned on prior to the screen of the television turning on.

2. The illuminated logo system of claim 1, wherein the circuit controls the brightness of the controlled source of light dependent upon both the ambient light as detected by the sensor and an operating mode of the device.

3. The illuminated logo system of claim 1, wherein the controlled source of light comprises one or more light emitting diodes.

4. The illuminated logo system of claim 1, wherein the sensor comprises one or more photo diodes.

5. A method of controlling an illuminated logo on a bezel of a television, the method comprising:
  providing an illuminated logo and a circuit for controlling a brightness level of the illuminated logo;
  detecting a level of ambient light; and
  controlling the illuminated logo based upon the level of ambient light, and also based on an operating condition of the television, where controlling controls the logo to be a first color when the television is off, and to be a second color when the television is on, and wherein the logo is controlled to turn to the second color when the television is turned on prior to a screen of the television turning on.

6. The method of claim 5, wherein the circuit includes a light sensor, a processing element and a control circuit for controlling the brightness level of the illuminated logo.

7. The method of claim 6, wherein the step of controlling includes controlling the brightness level of the illuminated logo based upon the level of ambient light and at least one parameter, the parameter set by a viewer.

8. The method of claim 6, wherein the step of controlling includes controlling the brightness level of the illuminated logo based upon the level of ambient light and a time-of-day.

9. The method of claim 5, wherein the controlling includes controlling a pulse width of a current supplied to the illuminated logo.

10. The method of claim 5, further comprising a step of changing a color of the illuminated logo based upon an operating parameter of the television.

11. An illuminated logo system, the illuminated logo mounted on a television, the illuminated logo system comprising:
  a logo on a periphery of the television, where the television has a bezel surrounding a screen, the logo illuminated by a controlled source of light,
  a sensor, the sensor measuring an ambient light in a vicinity of the device, wherein the sensor and the logo are on a bezel of the television; and
  a circuit, the circuit controls a brightness of the controlled source of light dependent upon the ambient light as detected by the sensor, wherein the circuit includes a processing element, the processing element receives an indication of the ambient light from the sensor and the processing element controls the brightness of the controlled source of light dependent upon the ambient light as detected by the sensor and also based on an operating condition of the television and also based on a time of day, where the logo is controlled to be a first color when the television is off, and controlled to be a second color when the television is on, and wherein the logo is controlled to turn to the second color when the television is turned on prior to the screen of the television turning on.

12. The illuminated logo system of claim 11, wherein the circuit changes the brightness of the logo dependent upon both the ambient light and an operating mode of the device.

13. The illuminated logo system of claim 11, wherein the circuit includes a processing element, the processing element receives a value of the ambient light from the sensor and the processing element controls the brightness dependent upon the ambient light.

14. The illuminated logo system of claim 13, wherein circuit includes a processing element, the processing element receives a value of the ambient light from the sensor and the processing element controls the brightness dependent upon the ambient light and an operating mode of the device.

* * * * *